United States Patent [19]

Wenzel

[11] Patent Number: 4,853,927

[45] Date of Patent: Aug. 1, 1989

[54] METHOD AND CIRCUIT ARRANGEMENT FOR DECENTRALIZED CONTROLLED TRANSMISSION REROUTING

[75] Inventor: Robert Wenzel, Obermichelbach, Fed. Rep. of Germany

[73] Assignee: U.S. Philips Corporation, New York, N.Y.

[21] Appl. No.: 130,820

[22] Filed: Dec. 9, 1987

[30] Foreign Application Priority Data

Dec. 10, 1986 [DE] Fed. Rep. of Germany ....... 3642141

[51] Int. Cl.$^4$ .......................... H04J 3/14; H04L 1/00
[52] U.S. Cl. .................................. 370/16; 340/825.01
[58] Field of Search ..................... 370/16; 340/825.01, 340/827; 371/8

[56] References Cited

U.S. PATENT DOCUMENTS

| | | | |
|---|---|---|---|
| 4,375,681 | 3/1983 | Abbott et al. | 370/16 |
| 4,646,286 | 2/1987 | Reid et al. | 370/16 |
| 4,680,750 | 7/1987 | Davidow | 370/16 |
| 4,700,340 | 10/1987 | Beranek | 370/16 |

FOREIGN PATENT DOCUMENTS 0031943 3/1984 European Pat. Off. .
2012526 7/1979 United Kingdom .

—OTHER PUBLICATIONS

Schickner et al., "Requirement for & Design of an Automatically Switched 140 Mbit/s Digital Service Protection", British Telecommunications plc and The Plessy Company, plc, IEE Telecoms Conf., 1988, pp. 74–77.

"Plessy ASDSPN System", A leaflet from the Plessy Company dated 1986.

P. J. Sutton, "Service Protection Network", published by British Telecom plc in 1986.

Nlf Hedman et al., "Automatic Protection Switching of Transmission Links", Ericson Review, No. 1, 1979, pp. 40–48.

Primary Examiner—Douglas W. Olms
Attorney, Agent, or Firm—Thomas A. Briody; Jack E. Haken; Anne E. Barschall

[57] ABSTRACT

The transmission restoration for faulty operating paths is generally constituted by a direct transmission restoration or a centrally controlled transmission rerouting. In the substitute direct transmission rerouting, N restoration links are permanently assigned to M operating paths, so that when faults affect more than N operating paths, M−N operating paths do not have the possibility to switch to the restoration link. With the centrally controlled transmission rerouting the employment of the restoration link requires reporting this fault to the supervising station as well as transmitting the control message from the supervising station to the switching matrices. The time required thereto generally causes all connections through the faulty operating path to be broken. By means of decentralized controlled transmission rerouting in which the rerouting control devices positioned after the location of the fault in the direction of transmission take over the master function for the transmission direction involved, one restoration link is always determined, in a simple manner and independent of each other, which need not perforce be led along the same route or in the same transmission system. Hence, a restoration link in the relevant direction of transmission can be determined and switched to immediately without the monitoring devices which detect the fault in the message transmission system having to communicate with each other.

5 Claims, 5 Drawing Sheets

METHOD AND CIRCUIT ARRANGEMENT FOR DECENTRALIZED CONTROLLED TRANSMISSION REROUTING

BACKGROUND OF THE INVENTION

1. Field of the Invention

The invention relates to a method for decentralized controlled transmission rerouting of operating paths in a message transmission network comprising operating stations, restoration links, switching matrices and rerouting control devices.

2. Prior Art

Message transmission networks enhance their reliability by use of automatic rerouting switching for individual message transmission paths in case of faulty interruption of transmission paths. When assigning restoration links, two different categories can be used, the direct transmission restoration system and the transmission rerouting system.

In the transmission rerouting system (decentralized concept) N rerouting links are permanently assigned to M operating paths between two line ends (terminal stations of the transmission path). German Pat. No. DE-AS 27 53 420 discloses an arrangement for direct transmission restoration system for digital signals, in which the fifth to seventh bit of the message word are substituted by the address of the transmission system to be switched over. From a line terminal station in the substituted system this address is returned, in a combination not used for addresses, as an acknowledgement signal to the terminal station in the substitute system which transmits the address. To monitor the individual transmissions sections the frame synchronization word is used. The alarm is made known by means of a signal commonly referred to an alarm indication signal (AIS), which is produced by an AIS generator arranged in the line terminal station and which is used to suppress trailing alarm signals on the subsequent signal paths. Hence, the occurrence of alarm signals is avoided in all transmission sections subsequent to a disturbed transmission section.

FIG. 1 shows the message transmission network for such a method of the direct transmission restoration. Also in a meshed network only the control devices S assigned to the line end terminals LE can dispose of the N restoration links E. In case of disturbances affecting more than N normal links, up to M-N links will not have the possibility of transmission restoration.

The monitoring of the transmission links and the switching of the normal links B to the restoration links E is controlled by the control devices S1, S2 arranged at the line ends. If the substitute circuit has to be switched to for both directions of transmission (including the possibly undisturbed opposite direction), an exchange of data will be required between the control devices S1, S2 aranged at the line ends. One of the control devices S1 assigned to the line terminal stations LE has to assume the master function for both directions of transmission.

With a 1:1 (that is to say M=N=1) direct transmission restoration there is no need to exchange data between the control devices S, as restoration link E and normal link B simultaneously carry the operating signal and, consequently, only have to be switched over in case of a failure.

With a transmission rerouting in a meshed transmission network there is a possibility, to switch to more than restoration paths E replacing M normal paths B, when there are N<M restoration links E between the restoration switching points (restoration switching matrices), as long as idle restoration links E are still available in the network. This is achieved by bypassing on a larger scale the failed normal links B, which allows switched to further restoration links E in addition to the N restoration links E directly assigned. With respect to such transmission rerouting, so far only a centrally controlled concept has been implemented, which implies that the transmission rerouting is controlled by the central station M. FIG. 2 shows the network structure for a centrally controlled transmission rerouting.

In order to suppress trailing alarm signals, for example when signal loss occurs, the alarm indication signal AIS is used in digital transmission technology, which signal is a permanent "1" signal in the digital hierarchy building up to 2.048 Mbit/s. In the European Patent Application EP-B 10 31 943 a monitoring of transmission paths for digital signals is disclosed, in which an AIS generator arranged in the line terminal station LE produces a signal, which is used to suppress trailing alarm signals on the subsequent signal path. Thus, it is avoided that in case of disturbance in a transmission path section, alarm signals will occur in all subsequent sections of the transmission paths. In the centrally controlled rerouting system disclosed in EP-B-10 031 943 such AIS generators are also arranged in the intermediate regenerators. The line terminal stations LE comprise monitoring devices in addition to the AIS generators, which devices are connected to the central network monitoring station M via a control line D. All disturbances are reported in first instance to the central station M, and this central station M gives the relevant orders to the substitute rerouting controls KF1, KF2, . . . involved, on the basis of the condition of its information about the map of the network. From the central station M the AIS generator can also be connected, remote-controlled via a change-over switch, to the output of the line terminal station LE on the receiving side.

Conflict situations are impossible with the centrally controlled transmission rerouting system, even when fault messages from individual sections arrive at the central station M for both transmission directions uncoordinated in time and at different instants. In the central station M the actual map of the network that is used for controlling the substitute system is stored continuously.

The method of centrally controlled transmission rerouting described above has the disadvantage, that essentially two operations for the transmission of information are required, that is to say a message about the interruption to the central station M and the transmission of the control message to the substitute switching controls KF1, KF2 . . . , which also require extra time.

SUMMARY OF THE INVENTION

The invention has for its object to provide a method for a decentralized controlled transmission rerouting of transmission paths in a message transmission nework, in which the switching operation to the substitute system is effected in the shortest time possible.

This object is achieved according to the invention by a method wherein the message transmission network is subdivided into zones and each zone has assigned thereto just one rerouting control device arranged in an operating station, in that the rerouting control devices are fully meshed via data lines and store at least the map of the network of the restoration links for of their own zones and adjacent zones and in that the control of transmission rerouting for both directions of transmission of an operating path is effected by means of rerouting control devices which are independent of each other and adjacent to the location of the fault.

The method according to the invention has the advantage that without including a central station, the switching to operation is expedited, so that disconnecting existing connections is prevented in a reliable manner. In the decentralized controlled transmission rerouting the rerouting controls are completely intermeshed through data lines, and the information required for a controlled transmission rerouting is transmitted in a data transmission network through channels which are error-protected.

In order to further reduce the operating time for rerouting switching (chain of actions: fault detection, fault processing, determination of the substitute path, control of the switching matrix), a preset number of restoration links, for example, can be determined and stored in the rerouting devices. If a fault occurs, the restoration links are read out from the associated memories, and the control of the transmission rerouting for the two directions of transmission of an operating path is effected separately by means of the rerouting control devices, which are independent of each other and adjacent to the location of the fault in the direction of the transmission. The maximum storage capacity is required when all information signals relating to the transmission rerouting (the actual condition of the network) are stored in the control devices of the restoration links. Generally, however, only the maps of the networks of its own area and adjacents areas for a limited number of restoration links are stored.

With the method according to the invention there is no communication between the rerouting control device and the rerouting control device adjacent to the location of the fault, to determine, in case a fault occurs, which of the two rerouting control devices will act as the main station to control the substitute circuit in the two directions of transmission. By letting the rerouting control device, which follows the location of the faults in the direction of transmission, provide only the substitute circuit in this direction of transmission, a conflict situation can be avoided in a simple manner.

This conflict situation results from the fact that it is usually advantageous to lead the two directions of transmission of a transmission path even in the case of rerouting switching via one common channel, that is to say via a pair of coaxial or glass fibre lines.

For the decentralized rerouting network switching a restoration link is determined in the rerouting control of the rerouting switching control device which follows the location of the fault seen in the direction of transmission. When interrupting a cable carrying a plurality of systems at the ends of a section that is monitored, fault messages can occur for the individual systems and directions of transmission at different instants and in different order.

In order to avoid the disconnecting of existing telephone connections, the rerouting switching has to take place approximately within one second, whilst for fault detection only a short time interval of approximately 100 ms is available.

With the method according to the invention, the rerouting control devices, which follow the location of the fault seen in the direction of transmission, take over the master function for the direction of transmission involved. The two rerouting control devices each determine one restoration link when both directions of transmission are disturbed, which paths links need not necessarily be led along the same route in exceptional case, or in the same transmission system. However, there is certainly no chance that two different transmission paths are switched to one and the same restoration link.

With the method according to the invention, a restoration link in the relevant direction immediately is determined and switched to, without the need of communication between the rerouting control devices detecting the fault. To this end there is remote control from the rerouting control device, of all the sub-stations required for the rerouting circuit, for example rerouting switching matrices of outside monitoring stations.

Only in a second stage each transmission link per se is switched to a common transmission path for the directions belonging together, if the management of the message transmission network so requires. This switching operation can take place in periods when there is little traffic. In that case, one of the rerouting control devices is the main station for both directions of transmission. This master function previously was determined when the operating path was established.

If the packet data network is utilized, to mesh the rerouting controls, there will be little additional cost for meshing the rerouting controls.

In a further embodiment a central network monitoring station (ZR1) is arranged in the message transmission network. In this station the actual network map is stored. The station is connected to the rerouting control devices (ST1, . . . , STn) via lines (L). The rerouting control devices store the mapping of the restoration links relevant thereto. After transmission rerouting, the central network monitoring station (ZR1) determines the restoration link routing in the message transmission network anew. At least portions of the new restoration link map are stored in the rerouting control devides (ST1, . . . , STn). In this further embodiment, required storage capacity and operation of a decentralized controlled transmission rerouting circuit in the rerouting controls are reduced in a simple manner.

The circuit arrangement to implement the system according to the invention requires little additional circuitry, has arrangements already incorporated in the message transmission network can be utilized for the decentralized controlled transmission rerouting as well. This additional circuitry is mainly caused by the higher storage capacity for substitute path nework maps.

BRIEF DESCRIPTION OF THE DRAWING

The invention will now be further described and explained with reference to an embodiment represented in the drawing, in which.

DETAILED DESCRIPTION OF THE PREFERRED EMBODIMENT

Figure 1:
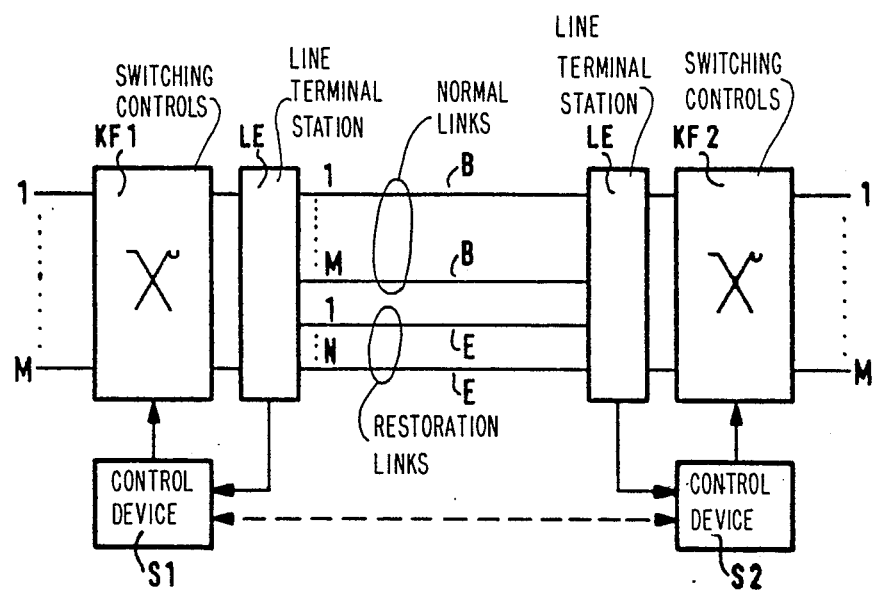
FIG. 1 shows a network structure for the known direct transmission restoration.
Figure 2A:
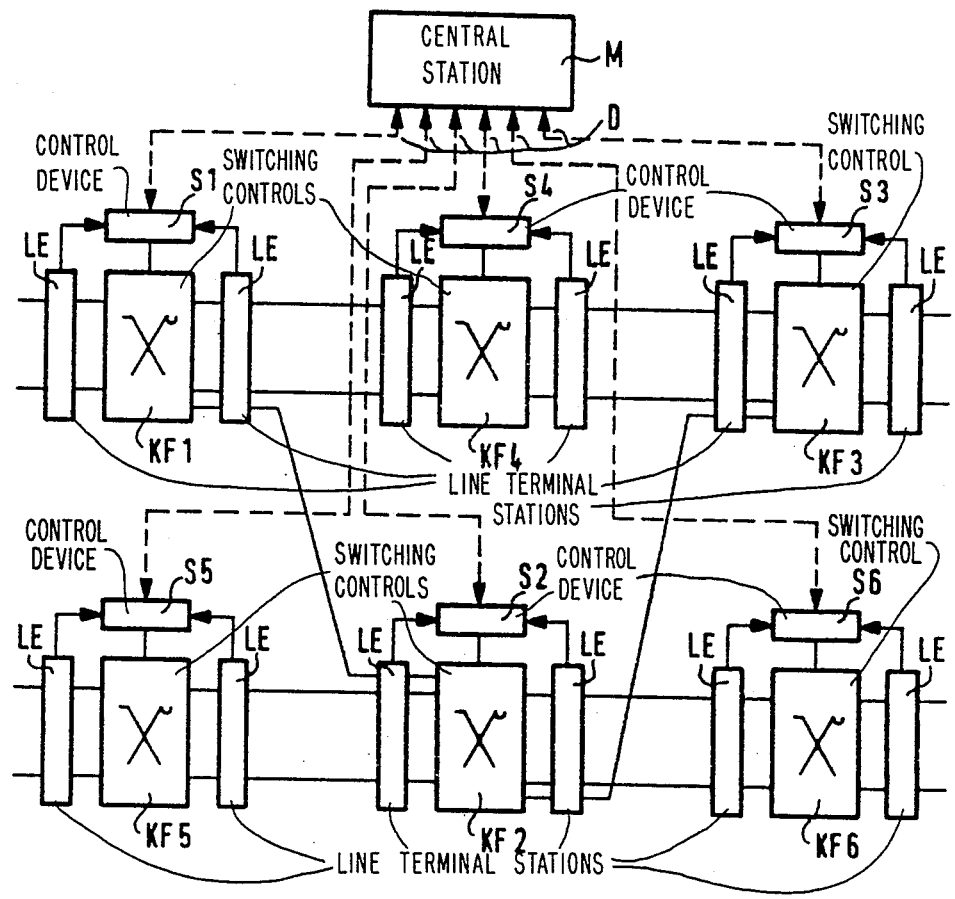
FIG. 2a shows an example of the network structure for the known centrally controlled transmission rerouting.
Figure 2B:
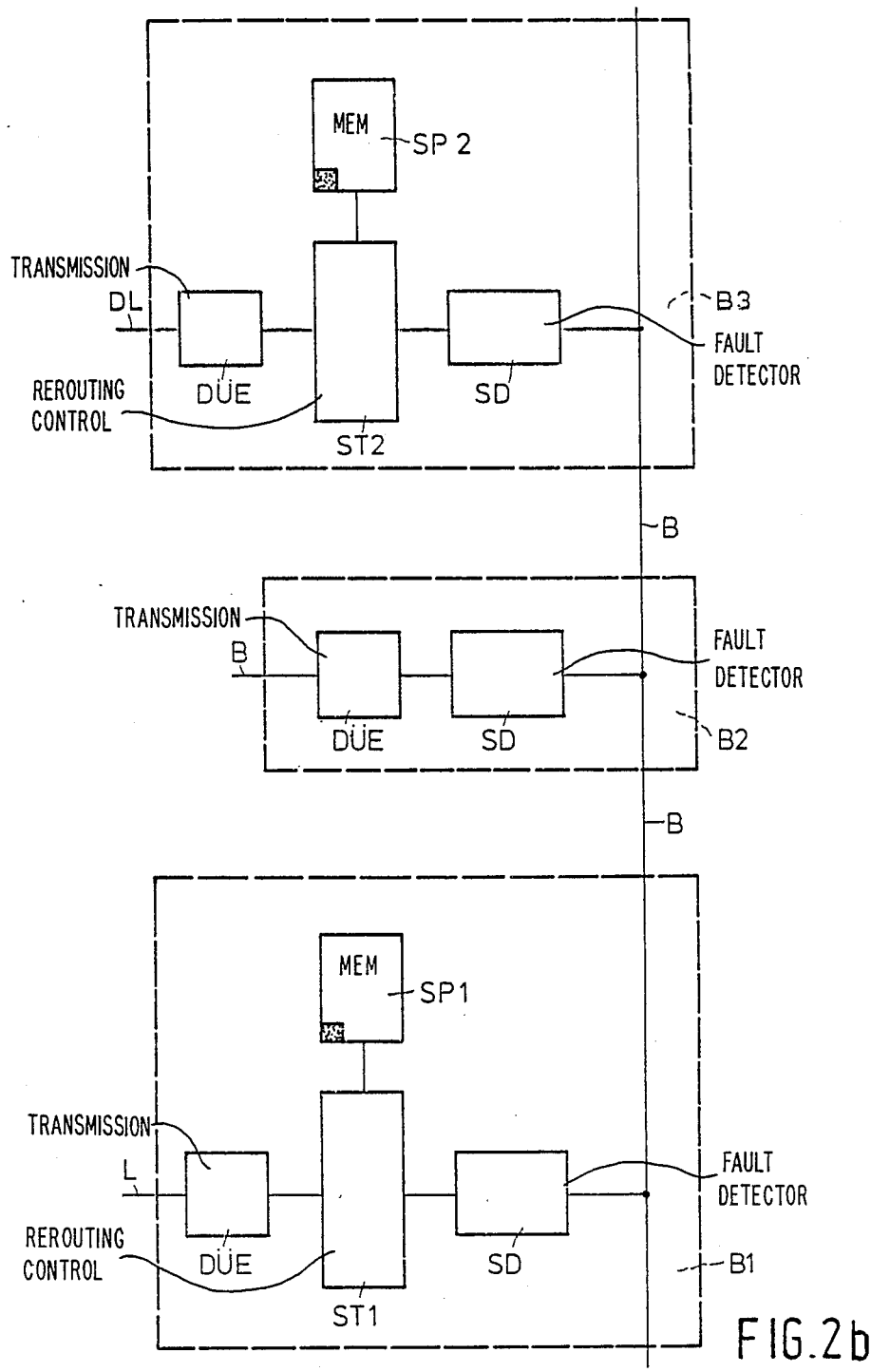
FIG. 2b shows a block diagram of a circuit arrangement for implementing the system according to the invention.

FIG. 2b shows the block diagram of a circuit arrangement for implementing the system according to the invention. In each operating station B1 . . . Bm a fault detecting circuit SD is arranged, which is connected to a transmitter DÜE that is connected to the message transmission network. The rerouting control devices ST1, . . . STn are connected on the one hand to a respective storage device SP1, . . . SPn containing the map of the substitute path network and on the other hand to the transmitters DUE.

Figure 3:
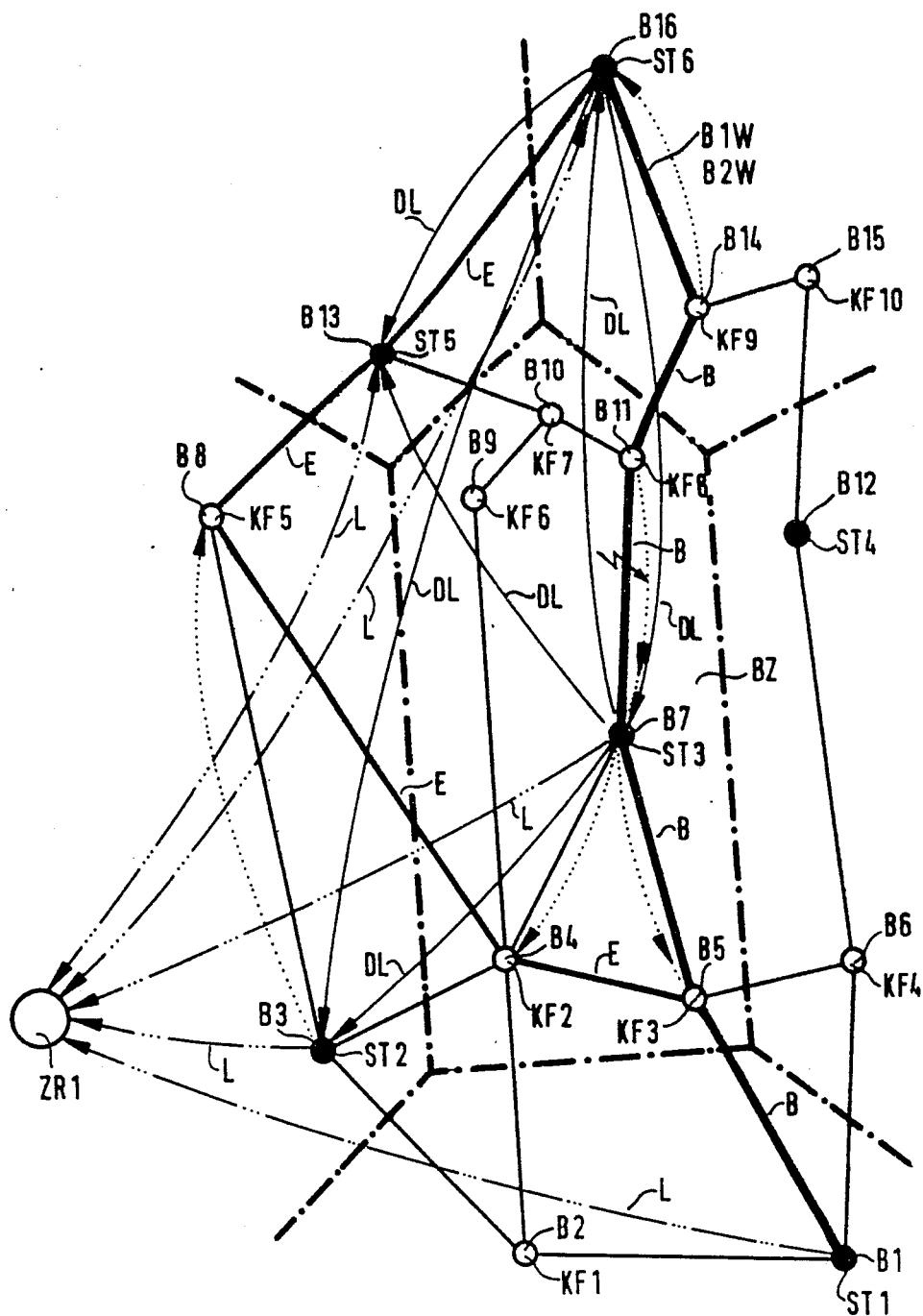
FIG. 3 shows an example of the network structure for decentralized controlled transmission rerouting according to the invention and a disturbance in an operating transmission path in one zone and FIG. 4 shows an example of the network structure for a decentralized controlled transmission rerouting according to the invention and a disturbance in an operating transmission path between adjacent zones.

The system for the decentralized controlled transmission restoration will be further explained with reference to the network structure represented in FIG. 3.

In the message transmission network are arranged operating stations B1, . . . Bm interconnected via operating paths B and restoration lnks E. The message transmission network is subdivided into zones BZ and to each zone in just one of the operating stations, for example B7, B13 and B16, a rerouting control device ST3, ST5 and ST6 is assigned. In FIG. 3, operating stations Bm having rerouting control devices STn and switching matrices KFo are denoted by the symbol ●. Operating stations Bm having switching matrices KFo are shown in FIG. 3 by the symbol O .

The substitute path control devices STn are fully intermeshed through data lines DL. Each zone BZ has no more than one rerouting control device, for example ST3, with a switching matrix and assigned thereto a plurality of remote-controlled operating stations having switching matrices, for example, B11 with KF8. In the rerouting control devices STn at least the network maps of the zone BZ itself and of adjacent zones are stored. The control of the decentralized controlled transmission rerouting for the two directions of transmission of an operating path B is effected by means of rerouting control devices STn which are independent of each other and adjacent to the location of the fault. For the following explanation of the system according to the invention, let it be assumed that there is a connection between the operating stations B1, B5, B7, B11, B14 and B16.

Between the operating stations B7 and B11 a fault occurs. If this fault affects both directions of transmission, it is detected in the one direction of transmission in the operating station B7, by means of the control device ST3, whilst the fault in the other direction of transmission is detected in the operating station B11. This operating station B11 reports the fault to operating station B7 (the connection is indicated by a dotted line), so that the messages of a fault relating to both directions of transmission meet there.

The rerouting control device ST3 arranged in the operating station B7 reads from the memory the restoration link E via the operating station B4, B8, B13 and B16 to be selected for the fault in question. Seen from the operating stations Bm to be controlled by the rerouting control device ST3, arranged in the operating station B7, the operating stations B5 and B7 are situated inside their own zone BZ and can therefore be triggered directly by the rerouting control device ST3. The respective switching matrices KF3, KF2, arranged in the operating stations B5 and B4, are switched accordingly by the rerouting control device ST3.

The operating stations B8, B13 and B16 are situated in outside zones BZ whilst the switching matrix KF5 arranged in the operating station B8 is remote-controlled by the rerouting control device ST2, arranged in the operating station B3. Thus, the rerouting control device ST3 has only indirectly access to the switching matrix KF5, arranged in the operating station B8, via the rerouting control device ST2.

Furthermore, a central network monitoring station ZR1 is arranged in the message transmission network, which station is connected to the rerouting control devices STn via lines L. The network map is stored in the central mnetwork monitoring station ZR1. After the restoration link E has been switched to, leading through operating stations B5, B4, B8, B13 and B16, the rerouting control devices ST3, ST2, ST5 and ST6, arranged in the operating stations B7, B3, B13 and B16, send out a message to the central station ZR1 about this restoration link E. From the central station ZR1 then immediately follows a message to the rerouting control devices STn, which could want to utilize portions of the restoration link E which is occupied now for their own rerouting switching purposes, in order to block this restoration link or portions thereof, respectively, to further decentralized controlled transmission rerouting. Then, the central station ZR1 determines the route of the in the message transmission network once again, and informs the rerouting control devices STn of the new route of the restoration link.

Figure 4:
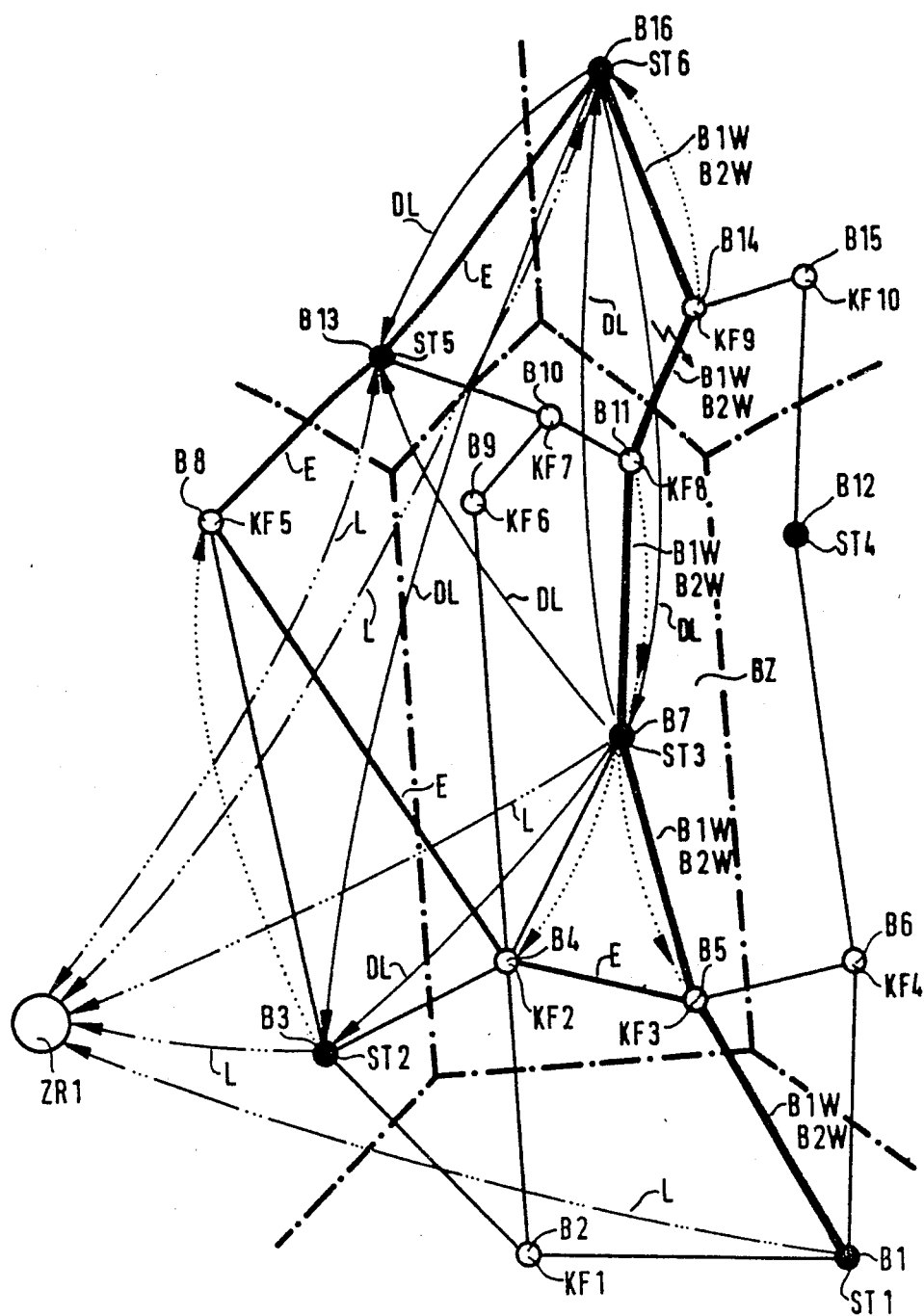

With reference to FIG. 4 the decentralized controlled transmission network switching will be further explained referring to a fault in the operating path B between operating stations Bm arranged in adjacent zones BZ. In the following explanation it is assumed that the operating path B between the operating stations B11 and B14 is disturbed.

The process of the control by the substitute path control device ST3, arranged in operating station B7, takes place in the same manner as was explained with reference to FIG. 3. For the second direction of transmission, which is monitored by the operating station B14, and in which the occurrence of a fault is reported to the control device of the restoration link ST6, arranged in the operating station B16, the route of a restoration link E will be determined in the rerouting control device ST6, arranged in the operating station B16, if a fault occurs relating to both directions of transmission, independent of the control process by the rerouting control device ST3. A condition for this is a fault occurring substantially simultaneously in the two directions of transmission.

On condition that for the two directions of transmission the same route of the substitute path E was stored in advance in the two rerouting control devices ST6 and ST3 there will be a switching-over to the rerouting which was determined in restoration link control devices ST6 and ST3, respectively.

For the case in which a plurality of transmission paths are disturbed in both directions of transmission substantially simultaneously (for example when a multi-phase, multi-pair cable is cut off), it may happen—as a result of the fact that the restoration links En required in large numbers are now determined independent of each other in the rerouting control devices STn and the transmission paths have broken down in a different order—that operating paths BnW which do not belong together are switched to one and the same restoration link E (for example direction a of the operating path B1W between the operating stations B1 and B5, B7, B11, B14, B16 with direction b of operating path B2W between the operating stations B1 and B5, B7, B11, B14, B16). As long as restoration links En can be found for the operating paths BnW that have broken down, this has no adverse consequences. During the time period in which there is little traffic load, a subsequent switching-over of the crossed transmission paths can take place, if so required by the operation monitoring device.

The method and circuit arrangement according to the invention for decentralized controlled transmission rerouting is thus instrumental in producing in a simple manner and in the shortest time possible a switchover from the faulty transmission path B to the restoration link E. The additional storage capacity required for substitute control devices STn is relatively small.

What is claimed is:

1. A message transmission network comprising:
   (a) a plurality of zones (BZ), each respective zone comprising:
      (i) a respective plurality of operating stations (B1, . . . , Bm), and
      (ii) a single respective rerouting control device (ST1, . . . , STn) arranged within one of the respective operating stations of the respective zone which store at least a map of a network of restoration links for the respective zone and adjacent zones;
   (b) a plurality of operating paths (B) for transmitting messages between the operating stations,
   (c) a plurality of restoration links (E) for carrying rerouted messages between the operating stations (B1, . . . , Bm) in case of a fault in transmission via the operating paths, and
   (d) a plurality of data lines DL for fully meshing the respective rerouting control devices,
   wherein each respective rerouting control device controls transmission rerouting for any fault occurring adjacent to the respective rerouting control device independently of the other rerouting control devices.

2. The network of claim 1 wherein
   (a) each operating path transmits messages in both of first and second directions; and
   (b) the respective rerouting control devices reroute messages from both the first and second directions over a same restoration link.

3. The network of claim 1 wherein the data lines constitute a packet data network.

4. The network of claim 1 further comprising
   (a) a central network monitoring station (ZR1) for storing a complete network map and for determining new restoration links after a transmission rerouting; and
   (b) a plurality of lines (L) coupled between the central network monitoring station and the rerouting control devices; and
   wherein
   (c) the rerouting control devices store only respective relevant subsets of the complete network map including relevant ones of the new restoration links.

5. The apparatus of claim 1 wherein
   (a) each operating station comprises:
      (i) a fault detecting circuit (SD); and
      (ii) a data transmitting arrangement (DÜE), coupled to the fault detecting circuit and the message transmission network; and
   (b) each respective zone comprises:
      (i) a single respective storage device (SP1, . . . , SPn), coupled to the respective rerouting control device and to the data transmitting devices in its zone, for storing a map of relevant restoration links for possible faults occurring adjacent to the respective rerouting control device.

* * * * *